(12) United States Patent
Wyman

(10) Patent No.: US 7,517,922 B2
(45) Date of Patent: Apr. 14, 2009

(54) ROADWAY REPAIR AND MAINTENANCE

(76) Inventor: Ransome J. Wyman, 25202 Via Las Palmas, Laguna Niguel, CA (US) 92677

( * ) Notice: Subject to any disclaimer, the term of this patent is extended or adjusted under 35 U.S.C. 154(b) by 312 days.

(21) Appl. No.: 10/951,197

(22) Filed: Sep. 28, 2004

(65) Prior Publication Data
US 2005/0038139 A1 Feb. 17, 2005

Related U.S. Application Data

(63) Continuation-in-part of application No. 10/016,761, filed on Oct. 30, 2001, now abandoned.

(51) Int. Cl.
*C08K 9/10* (2006.01)
*C08K 3/36* (2006.01)
(52) U.S. Cl. .................. 523/205; 523/206; 523/215
(58) Field of Classification Search ......... 523/205–206, 523/216, 215; 524/492–493, 59
See application file for complete search history.

(56) References Cited

U.S. PATENT DOCUMENTS

| | | | | |
|---|---|---|---|---|
| 3,426,831 A | * | 2/1969 | Robins et al. | 164/526 |
| 3,645,942 A | * | 2/1972 | Brown et al. | 523/142 |
| 4,031,282 A | * | 6/1977 | McClinton | 428/141 |
| 4,082,916 A | * | 4/1978 | Jaklic et al. | 174/524 |
| 4,246,157 A | * | 1/1981 | Laitar | 524/141 |
| 4,651,798 A | * | 3/1987 | Rikker | 164/34 |
| 5,852,071 A | * | 12/1998 | Geoffrey | 523/143 |
| 6,040,355 A | * | 3/2000 | Kurple | 523/139 |
| 6,052,964 A | * | 4/2000 | Ferm et al. | 52/742.14 |

FOREIGN PATENT DOCUMENTS

| | | | |
|---|---|---|---|
| JP | 73006929 | * | 3/1966 |
| JP | 2000-102842 | * | 4/2000 |
| SU | 1010090 | * | 4/1983 |
| SU | 909973 | * | 11/1984 |

* cited by examiner

*Primary Examiner*—Peter Szekely
(74) *Attorney, Agent, or Firm*—Berliner & Associates

(57) ABSTRACT

A flowable material for pavement repair and maintenance comprises rounded sand coated with a polymer surfactant to be non absorbent of water in the presence of a polymer mix which allows time for easy placement of the mix into damaged pavement. The polymer surfactant coating creates a strong affinity between the sand and the polymer mix. The materials are chosen preferably to cause an isoviscous reaction to occur. This type of reaction is characterized by a setting phase which stabilizes the repair before a rapid change in viscosity occurs and may be further enabled by an excess of polymer to increase flowability. An excess of polymer insures that sufficient binder remains at the upper portions of the repair to provide flexible and waterproof structure while excess fluid components settle to the bottom of the repair before setting occurs to seal the surrounding pavement. The slow buildup of viscosity allows the sand to settle so that the mix becomes self-compacting.

9 Claims, 2 Drawing Sheets

ROADWAY REPAIR AND MAINTENANCE

This application is a Continuation-in-Part of application Ser. No. 10/016,761 filed Oct. 30, 2001 now abandoned and is incorporated herein by reference for all purposes.

FIELD OF THE INVENTION

This invention relates to the maintenance of asphalt and concrete pavement and more particularly to systems, materials and procedures for repairing and maintaining pavement such as roadways in a manner to provide support for the roadway structure.

BACKGROUND OF THE INVENTION

The dismal state of American roadways is well documented as is the deficiency in the funding for taking corrective measures. One basic problem with roadways is that the materials used are to a large extent incompatible with and dissociate from one another in response to traffic, a process accelerated in the presence of water. This is particularly true for asphalt concrete roadways. But as will become clear hereinafter, the remedy will be applicable to Portland Cement Concrete (PCC) roadways as well.

Asphalt concrete is a mixture of graded rocks and sand with asphalt oils. The composition requires no joints because it is flexible and can easily move to accommodate thermal expansion and contraction. Asphalt concrete is easy to place and creates a smooth pavement that supports heavy loading.

Asphalt concrete is applied hot and is ready for traffic when compacted and cooled. Because of the low cost, the simplicity and speed of application, and short time for return to traffic, asphalt concrete is the dominant pavement for building roads, driveways, and parking lots.

Unfortunately, rock and sand combined with asphalt oils is an inherently unstable mix with a short service life compared to Portland cement concrete pavements. Asphalt oils are nonpolar and do not form a strong attraction to polar materials like rocks and sand. Water has a strong attraction to the polar aggregates and readily displaces t he asphalt oils. It is for this reason that water flowing over asphalt concrete pavements rather quickly removes the asphalt oils to expose and ravel the rocks and sand.

But a more serious limitation is caused by the flow of asphalt oils because of the continuous movement which occurs under traffic loads and thermal expansion and contraction. Rock and sand specify gravity is 2.6. Asphalt oils specific gravity is 1.1. This large difference in specific gravity causes rocks and sand to sink and asphalt oils to rise.

The difference in expansion and contraction, heat capacity, and thermal conductivity between asphalt oils and rocks and sand creates internal forces to force asphalt oil flow. As the asphalt concrete pavement heats, oils with their low heat capacity warm quickly, liquefy and expand at a rate much greater than the expansion of rocks and sand. The path of least resistance for expanding flowable oils is up to the surface.

Oil on the surface is exposed to traffic, heat and cold, oxygen, wind, dirt and sand, ultraviolet light and water to volatilize, oxidize, wear away and emulsify the exposed oils into the environment.

Thermal expansion is followed by thermal contraction as the pavement cools at night. The spacing between the rocks and sand and the asphalt oils is reduced from oil loss to shrink and stiffen the pavement.

It is no surprise then that as asphalt concrete ages and the asphalt oil disperses, the pavement becomes hard and brittle. Cracks form and the pavement shrinks. After the first cracks appear, breakdown accelerates rapidly. As water flows through the cracks to the base, the support for the pavement washes away. In short order more cracks appear followed by more serious pavement distress including potholes.

Although each of the components of asphalt concrete pavement is inherently stable and not readily prone to breakdown, the combination of rocks and oil is unstable. The situation is similar to the case with liquids. Liquids, such as oil and water are not mutually compatible, and are only made compatible by emulsification. The emulsion appears stable and uniform but the components are doomed to early separation in the absence of a suitable emulsifying agent or surfactant.

It is clear that asphalt concrete similarly is a mix of incompatible components with widely different polarity destined to a short life together unless means of stabilizing the mixture is used.

BRIEF DESCRIPTION OF THE INVENTION

This invention is based on the realization that the components normally used for roadway repair not only are incompatible, but also fail to result in any structural enhancement. The invention also is based on the recognition that if the aggregate used in roadway repair were treated with a polymer to be non absorbent of water, the aggregate would then be compatible with (i.e. less prone to separate from) asphalt oils, the other repair component. It is further recognized that a coated sand mix in a polymer system designed to provide a suitable lengthy working time would provide an ideal pavement maintenance set of products.

The resulting aggregation of material components in accordance with the principles of this invention are bound together by a polymer system, which may be cured in the presence of a catalyst, to effect a repair which is long lasting, available for use quickly, distributes any loads throughout the repair, is flexible to avoid damaging the contiguous undamaged road sections, and can be completed without costly equipment.

In accordance with the principles of this invention, materials for repairing pavement can be brought to a repair site in buckets. The aggregate is pretreated preferably with polymer surfactant in order to make the aggregate non absorbent (and non polar). The aggregate is mixed illustratively (82 percent by weight or more) with A and B organic polymers (and pigment) illustratively in the presence of a catalyst for at least one minute and the resulting mixture is poured into a clean hole for patching. The top of the repair may be trowelled flat and allowed to set for about one-half hour. The repair is then usable for traffic.

DETAILED DESCRIPTION OF ILLUSTRATIVE EMBODIMENTS OF THE INVENTION

Figure 1:
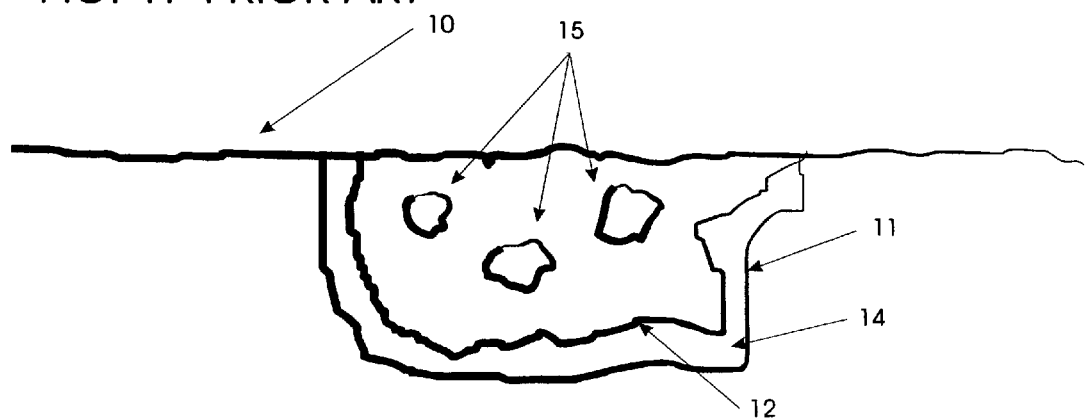
FIG. 1 is a schematic cross section of an illustrative prior art roadway repair.

Asphalt concrete is presently the material system of choice for repairing roadway damage. Asphalt concrete is a mixture of nonpolar asphalt oils and polar rocks and sand. Water flowing over asphalt pavements removes the asphalt oils to expose and ravel the rocks and sand.

In accordance with the principles of this invention, the sand and rock components of asphalt concrete are made compatible with the asphalt oils by coating the components with a polymer surfactant to render them non absorbing of water. This coating seals the aggregate so it cannot absorb water but also makes the aggregate nonpolar and thus creates a strong affinity between the asphalt oil and the aggregate.

The nature of the coating is analogous to soaps and surfactants that are used to create emulsions from water and oil. Soaps are made from fatty acids produced by reacting triglicerides with caustics to produce fatty acid alkaline salts. These soaps have a polar end, sodium or potassium, and a nonpolar end, the fatty acid chain. When soaps are used in combination with oils and water, emulsion form readily because the soap acts as a compatible interface between the oil and water. The term surfactant as used hereinafter will be understood to include soaps.

The coating for rocks and sand thus serves to form a compatible interface between the rock and sand surfaces and the polymer. This is achieved by creating a polymer that contains both polar and non-polar repetitive segments. The nonpolar segment is preferably methylene bis biphenyl, two aromatic rings linked with a methylene bridge. This structure has a strong affinity for the high molecular weight aromatic oils in bitumen (asphalt oils). The polar segment that has a strong affinity for the polar rock and sand surfaces is substituted urea.

The coating is simple to apply. The thin liquid composition is simply tumbled with the (previously dried and coated) aggregates until it is distributed evenly. The polymer is added to the aggregates up to about 0.5 percent by weight.

The polymer preferably is composed of a combination of polyiscocyanate and pigment dispersed in a phthalate ester. The ratio of the two components illustratively is 75 percent polyisocyanate and 25 percent, by weight, pigment dispersion. 0.1 percent dibutyl tin dilaurate is added to the coating prior to adding the aggregate. This catalyst promotes the reaction of the isocyanate with water that is in the air or in the sand. Carbon black dispersions are used when the aggregates are to be used with asphalt concrete. The mixture reacts with moisture to generate carbon dioxide gas and a methylene bis biphenyl polyurea polymer.

The speed of the reaction of the coating is affected by temperature and humidity. With higher temperatures the reaction is accelerated. The sand also may be heated to adjust the curing time.

Coated aggregates using these materials and methods also are useful for improving the water resistance for hot mix asphalt, for chip seals with hot oils and emulsions and for slurry seals. They are also useful for cold mix compositions. That is to say that coating aggregates (sand and rocks) to make them non absorbent of water significantly improves the lifetime of hot and cold mix repairs.

The tendency of traditional road repair materials to dissociate resulting in aggregate sand (and rocks) settling and asphalt oils rising, is overcome, in accordance with a further aspect of this invention, by choosing materials which not only are compatible with one another but are chosen to take advantage of the affects of gravity. The basic materials are sand, preferably manufactured, and polymer as stated hereinbefore. If an excess of polymer is used, particularly good flow characteristics are achieved. In this case, sand settles and polymer rises. It is clear that much of the fluid (polymer) portion of the mix remains at the top of the repair because of the excess quantity of polymer and dispersion of aggregate (sand) in the mix. The excess polymer allows the sand to mechanically interlock with, for example, a fractured cement flab base while the excess polymer provides for a sealed surface to the repair. Rounded sand may be used in this embodiment also.

Construction polymers presently used to coat, repair, seal and waterproof pavements, roofs and decks are typically mixed in small batches and applied with hand tools. They usually require an overnight cure and may require multiple applications over several days to complete the work.

Enough working time is needed to apply products properly and to create an acceptable finished appearance. Long working times mean a very long cure time. Thus, most reactive polymer products used in construction typically require long cure cycles and are not suitable for roadway repair.

For applications where scheduling is difficult and major disruptions to the use of a structure is unacceptable, work is usually delayed to weekends, nights or shutdowns when enough time is available to complete the application and the cure.

The use of rapid curing products is one alternative. Products that solidify within seconds and can be returned to traffic in a short time are well known. But, these products require special equipment, skilled operators, special training and ongoing equipment maintenance. Machine-applied rapid setting polymers can be very practical for large projects, but impractical for day-to-day use where skilled crews and high cost equipment cannot be justified.

A further purpose of the present invention is to create polymers that provide adequate application time for hand use yet cure quickly like machine applied products. This feature of long working time with fast cure provides compositions that can be packaged in kits and applied with simple hand tools quickly and easily yet there is no lengthy closure before return to use.

This aspect of the invention is based on the discovery that certain specific mixtures of polymer intermediates will react quickly as they proceed towards polymerization, yet do not increase in viscosity for several minutes prior to thickening and proceeding to final cure. This time, with no increase in viscosity, provides a window where reactive mixtures can be applied easily while creating a good finished appearance yet provide a fast cure.

The basis for this effect is created by the proper selection of a mix of three polymer intermediates with a small percentage of a cross linking molecule with reactive intermediates that provide large differences in reactivity so the rate of viscosity increase is delayed to the end of the polymerization reaction. What this provides is a mixture that builds viscosity slowly for several minutes. Increase in viscosity is not seen because the mixture warms as it reacts. This delays any increase in viscosity for several minutes.

The two components in the mixture with the lowest molecular weight, butane diol and MDI (methylene dianiline diisocyanate) with respective molecular weights of 90 and 250 react first because of the low molecular weight, high concentration and the primary functionality of the diol. As these react with each other, the average molecular weight of the entire mix increases slowly in the initial phase of the reaction.

As the butane diol and MDI are consumed and the molecular weight increases, the mobility and concentration of the reactants decreases rapidly further slowing the rate of reaction. The largest molecule in the initial mixture (1,000 average molecular weight) is a polypropylene glycol with reactive secondary hydroxyl groups. Secondary hydroxyl groups provide a slower reaction with the isocyanate than the primary hydroxyl groups of butane diol. Because of the large difference in reactivity and molecular weight compared to butanediol, it reacts slowly and is the last of the components to react to completion prior to the solidification of the mixture.

Finally, since the bulk of the components are difunctional, a high percentage of the components must react for solidification to occur. However, in order to provide a rapid cure, a small percentage of a cross-linking molecule, trilso propanol amine, is used. But this molecule too has reactive secondary hydroxyl groups and is sterically hindered. This delays its reaction to the final stages of polymerization so that as it finally reacts, hardness and strength develop quickly. This occurs because molecular weight buildup is very fast when cross linking is introduced.

The preferred mixture that provides lsoviscous polymerization (polymerization with no increase in viscosity during the initial phases of the reaction) is composed of a diisocyanate, a high molecular weight polypropylene glycol with reactive secondary hydroxyl groups, a low molecular weight diol with primary reactivity end a low molecular weight cross linker with secondary reactivity. Other useful polymers to this end with two active sites and three active sites, respectively, are glycols, polyols and triols with a mix of organometallic and both reactive and non-reactive amine catalysts. The organometallics include lead, tin, iron, mercury, and bismouth.

The result is a repair comprising polymer and sand which settles to fill in irregularities and lock into abutting solid structure. As the sand settles, the liquid polymer mix rises. Additional sand is broadcast over the repair. The sand and polymer form a solid yet flexible patch operative to distribute any forces over the entire patch surface. The result is a repair which improves the road structure and does not impact the abutting undamaged roadway. Rounded sand (preferably a mix of 12 mesh and 60 mesh, ⅔ and ⅓ by weight) forms a matrix which is flexible and, when set with the reacted polymer, is operative to distribute forces throughout the repair. The addition of angled sand results in a less flexible repair.

Figure 2:
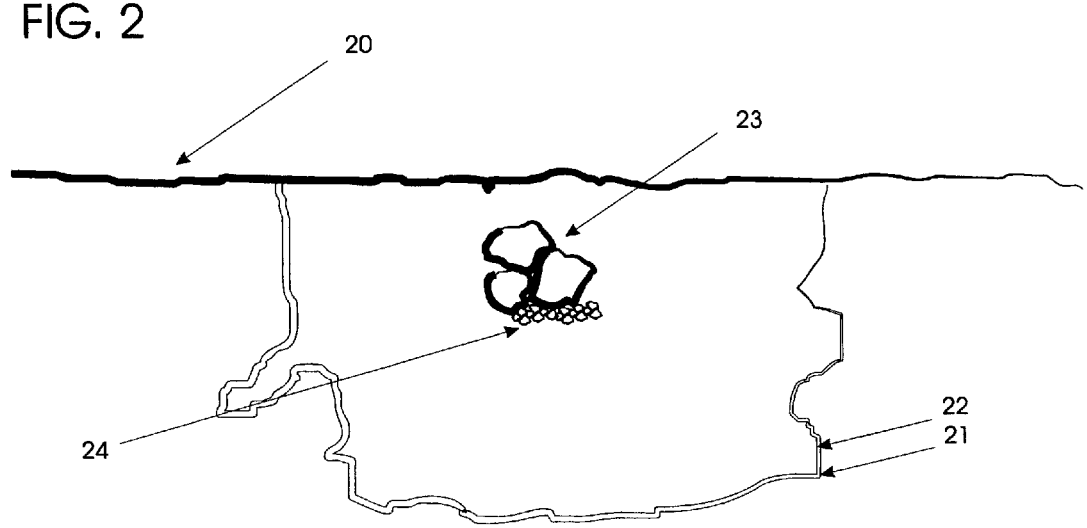
FIG. 2 is a cross section of an illustrative roadway repaired in accordance with the principles of this invention.

The advantages of a repair, in accordance with the principles of this invention, may be appreciated by comparing the results of such a repair with a similar prior art repair, as illustrated in FIGS. 1 and 2. FIG. 1 represents a prior art repair. The roadway 10 has a damage represented by jagged line 11 and the repair material occupies only the volume represented by jagged line 12. Not only is there a failure to achieve a full mechanical interlock with the surrounding undamaged roadway as indicated by the void 14 between lines 11 and 12, but additional voids occur throughout the repair as indicated at 15.

FIG. 2 represents a repair, in accordance with the principles of this invention, of a roadway 20. The repair forms a complete mechanical interlock between the surrounding undamaged structure represented at 21 and the repair material represented at 22 and indicated further by the absence of a space between the two lines (21 and 22). Further, the aggregate of the repair forms a contiguous structure where coated rocks (23) and coated sand (24) fill the entire repair.

A repair mix, in accordance with this invention, is very simple and at 75 degrees, repairs are ready for traffic in about an hour. Applications require only a portable drill with a mixing paddle and an asphalt lute (rake). No special skills or lengthy training are required. Gloves and protective eyewear are recommended, but since there is virtually no odor and no toxic fumes, no breathing masks or special ventilation are warranted.

To begin, pour the contents of a bottle marked "A" (polymer isocyanate) into the bucket and mix it with a pail mixer attached to a drill. The mixing takes a little more than a minute to uniformly mix the liquid with the sand. Next pour the contents of bottle "B" (a second polymer with the three polymer intermediates) and mix again for one minute. Then pour the contents into the damaged area and level to match the grade. The mixture is flowable.

Figure 3:
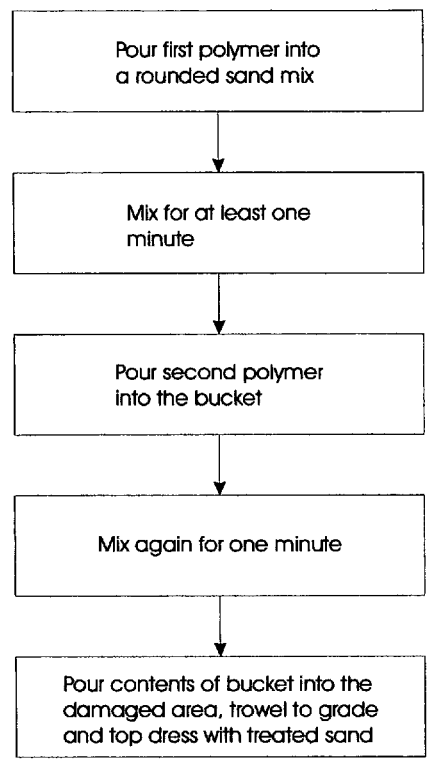
FIG. 3 is a flow diagram of the method of pavement repair in accordance with the principles of this invention.

Next, a hand-trowel may be used to smooth out the edges. Finally, topping sand illustratively is broadcast over the repair to create a high traction surface. The topping which looks like black sand, provides a high-traction surface and makes the finished repair look nearly identical to surrounding asphalt. Vehicles may drive over the repair in about an hour. The steps of the method are represented by the flow diagram of FIG. 3.

The structural integrity of the asphalt is restored with no asphalt removal. The repair is mechanically stronger than the asphalt and smooth. Vehicles passing over the smooth surface cannot detect a repair.

The strong but flexible repair is achieved when the rounded silica quartz (sand) settles into the irregularities in the damaged asphalt and the thin liquid separates. The mass immobilizes and is self-compacting. Additionally, the liquid migrates to seal the fine cracks and to provide a mechanical interlock to hold the topping aggregate.

The repairs resist fuels and oils, are not damaged by freeze/thaw cycles, are waterproof and support heavy traffic.

The addition of properly coated aggregate permits the reduction of the amount of polymer used and thus decreases the cost of materials used. The economies of use of the product not only can be reduced by such considerations which are more fully understood with use, but is in addition to the savings provided by the avoidance of the need for the removal of broken pavement and the reduced time required for road closure.

In accordance with a further aspect of this invention, the solution to stabilizing asphalt concrete pavements for long-term performance is to apply the materials disclosed herein as a strong, flexible polymer concrete surface layer. Dimensionally and environmentally stable polymer concrete up to ½ inch thick, for example, is applied over new asphalt. This surface stops the effects of weather and contaminants and immobilizes the asphalt oils that bind the asphalt concrete together. No oils separate from the asphalt concrete mix. The oils are confined by the polymer concrete barrier and cannot flow out. This assures long-term flexibility, stability and performance for the asphalt concrete. This waterproof polymer concrete barrier stops surface raveling from water and the effects of freeze/thaw and damage from fuels, oils and other chemicals. Materials in accordance with the present invention are particularly suitable to this end.

The recognition of the need for water proofed aggregate (sand and rock) coated with a polymer for providing improved performance and lifetime for both asphalt and Portland cement concrete thus can be seen to lead to a variety of products: The first, described herein, is a pavement patch material with the coated aggregate mixed with a polymer system. The second is the patch material with a particular mix of polymers which provide for a delayed increase in viscosity. A third product is a pavement coating.

A forth product is provided by tumbling a relatively small amount of the patch material (illustratively 10% by weight) with a relatively large amount of the coated sand mix and rock so that essentially all of the material is consumed in coating the sand mix and rock. This product utilizes angular or manufactured sand and (rock) and provides a material for repairing open graded asphalt concrete pavements.

Figure 4:
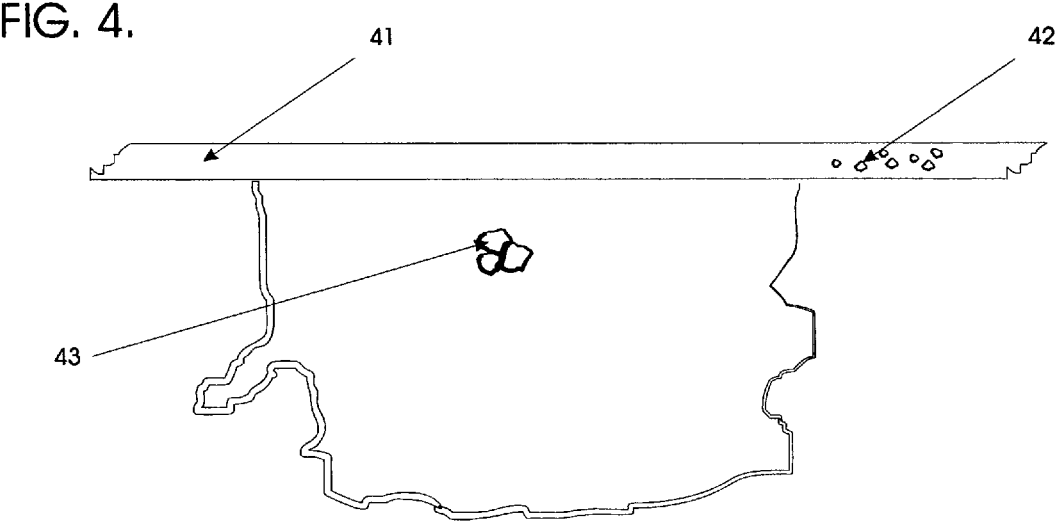
FIG. 4 is a schematic cross section of a pavement protective overlay in accordance with the principles of this invention.

FIG. 4 shows a repair as represented in FIG. 2 with an overlay 41. The overlay in this case utilized manufactured rock indicated at 42 and the pavement repair is shown with rounded rock (and sand mix) as indicated at 43.

The use of a polymer surfactant eliminates residual water and enhances the compatibility of the components in the concrete by making all the components nonpolar.

Specifically, polymer surfactant not only renders the sand and rocks non absorbent but also converts the sand and rocks to a nonpolar form thus enhancing the compatibility between the various components herein. In the embodiments where the sand and rocks are coated with a polymer surfactant and tumbled with the polymer mix (illustratively 10% by weight), the polymer mix operates to encapsulate clumps of sand and rock in an almost dry composite for open graded repair which may be compacted by roller in the usual manner.

In embodiments where the designed mix of coated sand and rock is tumbled with polymer mix to create a closed graded concrete, a composite is produced which may be compacted as cold mix and hot mix is now compacted.

The repair produced by the use of any of the embodiments herein has a memory in that it flexes to distribute any force on it over the surrounding surface and returns to its original shape when the force is removed.

What has been described herein is merely illustrative of this invention and those skilled in the art may devise variations thereof within the spirit and scope of the invention as encompassed by the following claims:

What is claimed is:

1. A composition for the maintenance of pavements, said composition comprising a mix of dried sand coated with a polymer and a pigment said sand mix comprising granules distributed in a polymer system comprising first and second polymer components such that the sand granules are held in a dimensionally stable form by the reaction product of said first and second polymer components wherein said first component is polar having a strong affinity to dried sand, and said second component non-polar having a strong affinity to the pavement material.

2. A composition as in claim 1 including a catalyst comprising an organo metallic.

3. A composition as in claim 1 wherein said first component is selected from a class consisting of aromatic di and poly isocyanates and said second component is selected from a class consisting of reactive hydroxyl components.

4. A composition as in claim 3 including a catalyst selected from a class consisting of organo metallics and organic amine catalysts.

5. A composition as in claim 1 wherein said sand granules are rounded.

6. A composition as in claim 1, said composition including a third polymer component, wherein said first, second and third components have a rate of polymerization faster than their rate of increase of viscosity.

7. A composition as in claim 6 wherein said first and second polymer components have relatively lower molecular weights than said third component and said composition includes a cross-linking molecule.

8. A composition for the maintenance of pavements, said composition comprising a mix of dried sand coated with a polymer, said sand mix comprising granules distributed in a polymer system comprising first and second polymer components such that the sand granules are held in a dimensionally stable form by the reaction product of said first and second polymer components, wherein said composition includes a third polymer component, said first, second and third components being reactive to polymerize at a first rate but increase viscosity at a second rate slower than said first rate, wherein said first and second polymer components have relatively lower molecular weights than said third component and said composition includes a cross-linking molecule, and wherein said first and second polymer components are butane diol and methylene dianiline diisocyanate and said cross-linking molecule is triiso propanol amine.

9. A composition for the maintenance of pavements, said composition comprising a mix of dried sand coated with a polymer, said sand mix comprising granules distributed in a polymer system comprising first and second polymer components such that the sand granules are held in a dimensionally stable form by the reaction product of said first and second polymer components wherein said composition includes a third polymer component, said first, second and third components being reactive to polymerize at a first rate but increase viscosity at a second rate slower than said first rate, wherein said first and second polymer components have relatively lower molecular weights than said third component and said composition includes a cross-linking molecule, and wherein said first component is selected from a class consisting of aromatic di and poly isocyanates; said second component is selected from a class consisting of reactive hydroxyl components; and said cross-linking molecule is triiso propanol amine.

* * * * *